United States Patent [19]

Zapf

[11] 4,121,706
[45] Oct. 24, 1978

[54] HUB, ESPECIALLY FOR CLUTCH DISKS OF MOTOR VEHICLES

[75] Inventor: Egon Zapf, Bühlertal, Germany

[73] Assignee: LuK Lamellen und Kupplungsbau GmbH, Bühl, Baden, Germany

[21] Appl. No.: 769,781

[22] Filed: Feb. 17, 1977

[30] Foreign Application Priority Data

Feb. 18, 1976 [DE] Fed. Rep. of Germany ....... 2606373

[51] Int. Cl.² .................................................. F16D 3/14
[52] U.S. Cl. .................................................. 192/106.2
[58] Field of Search ............. 192/106.1, 106.2, 107 C; 64/27 C, 27 S; 403/242, 274

[56] References Cited

U.S. PATENT DOCUMENTS

| | | | |
|---|---|---|---|
| 2,053,478 | 9/1936 | Horton | 403/274 |
| 3,817,362 | 6/1974 | Rist | 64/27 C |
| 3,938,635 | 2/1976 | Davies et al. | 192/106.2 |

FOREIGN PATENT DOCUMENTS 1,014,840  8/1952  France ....................................... 403/274

Primary Examiner—Gerald A. Dost
Attorney, Agent, or Firm—Herbert L. Lerner

[57] ABSTRACT

A hub includes a cylindrical hub body and means comprising a flange member for flanging the hub body, the flanging means being slidably mounted on and fastened to the hub body and extending in radial direction, at least one of the hub body and the flanging means being formed with profiling for effecting a form lock against relative movement thereof at least in circumferential direction, a respective abutment formed on the hub body on each side of the flanging means, at least one of the abutments being a wedged-over portion of the hub body received in a channel formed in the flanging means.

6 Claims, 1 Drawing Figure

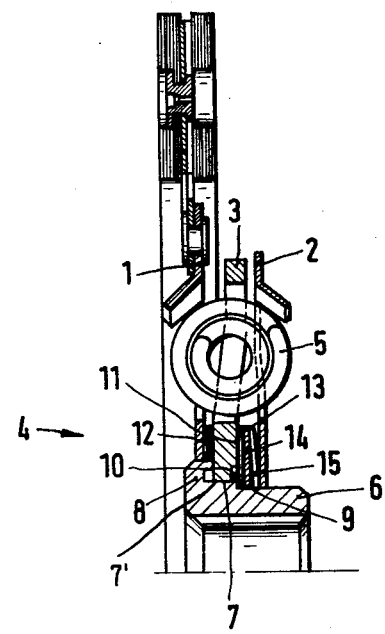

HUB, ESPECIALLY FOR CLUTCH DISKS OF MOTOR VEHICLES

The invention relates to a hub, especially for clutch disks of motor vehicles and, more particularly, to such a hub wherein a flange alone or a flange with at least one additional part extending in radial direction is fastened on a cylindrical hub body and at least one of the parts, hub body and/or flange have been provided with a profiling in the form, for example, of a toothing, to achieve a form lock effective at least in circumferential direction and, for securing the pushed-on part or parts in both axial directions, abutments, of which at least one is formed by wedging-over, are formed at the hub body on both sides of the part or parts.

A clutch disk of this general type with a toothing is pressed onto a shoulder part of the hub body until the flange makes contact with an abutment extending in radial direction, which secures the flange against further displacement in one axial direction. On the side of the flange facing away from this abutment, a washer is provided and, to secure the flange in the other axial direction, a wedged-over joint is formed against this washer from portions of the hub body wedged in direction toward the washer. Such a hub can be made, however, without a washer also, the wedging-over portion resting directly against the flange.

From German Published Non-Prosecuted Application DOS 2,159,263, it has further become known to press a flange onto a hub body and to ensure the securing thereof against further displacement in one as well as in the other axial direction by a wedged-over portion formed on both sides of the flange.

In clutch disks of this general type it is necessary, in order to obtain specific damping characteristics, to provide friction or sliding rings and, if necessary, additional spring elements, for example, in the form of cup or plate springs, either on the one or on both sides of the flange. In this connection, however, the wedged-over portions have been found to be a problem, since there is not always any assurance that, in the course of assembly, the rings, cup or plate springs or other parts also will come to lie in all cases concentrically or coaxially about this wedged-over portion. As a result, the functional reliability of the disk is no longer assured upon the occurrence of such assembly defects.

It is accordingly an object of the invention to provide a hub of the foregoing type wherein these shortcomings are eliminated and wherein the functional reliability is fully assured. It is also an object of the invention to provide such a hub which can, furthermore, be assembled more inexpensively, is therefore cheaper, and with which rejects are avoided.

With the foregoing and other objects in view, there is provided, in accordance with the invention, a hub comprising a cylindrical hub body and means comprising a flange member for flanging the hub body, the flanging means being slidably mounted on and fastened to the hub body and extending in radial direction, at least one of the hub body and the flanging means being formed with profiling for effecting a form lock against relative movement thereof at least in circumferential direction, a respective abutment formed on the hub body on each side of the flanging means, at least one of the abutments being a wedged-over portion of the hub body received in a channel formed in the flanging means.

The wedged-over portion is received, for example, in a channel that had previously been formed in the flanging means by stamping.

Through such a measure, the parts that are to be inserted between the flange and the friction lining support and/or a counterdisk, or the lining support of the counterdisk or the counterdisk per se come to lie on the wedged-over portion that is formed, and are thus not installed concentrically or coaxially and properly with respect to the hub body. In addition, an advantage is derived therefrom of obtaining an enlargement of the friction surface by the additional availability of the area occupied by the radial zone wherein the wedged-over portion is received, at least when, in accordance with a further embodiment of the invention, the wedged-over portion merges flush with the surface region which is adjacent in radial direction. A reduction of the surface pressure thus occurs, and the thickness of the friction or sliding ring can be reduced.

In accordance with a further feature of the invention, the flanging means include at least one other part besides the flange member, the part extending in radial direction and being formed with the formlocking profiling.

In accordance with an added feature of the invention, the flanging means include at least one other part besides the flange member, the channel being formed in the other part.

In accordance with an additional feature of the invention, the flange member extends in radial direction and is formed with the formlocking profiling.

In accordance with yet another feature of the invention, the channel is formed in the flange member.

In accordance with a concomitant feature of the invention, the channel is formed in a radially extending surface region of the flanging means, and the wedged-over portion of the hub body received in the channel is flush with the surface region.

Although the invention is illustrated and described herein as embodied in hub, especially for clutch disks of motor vehicles, it is nevertheless not intended to be limited to the details shown, since various modification and structural changes may be made therein without departing from the spirit of the invention and within the scope and range of equivalents of the claims.

The construction and method of the invention, however, together with additional objects and advantages thereof will be best understood from the following description of specific embodiments when read in connection with the single FIGURE of the drawing which is a half-sectional view of a clutch disk incorporating the hub of the invention.

Referring now to the FIGURE of the drawing, there is shown therein a friction lining support disk 1 connected in a conventional manner to a counterdisk 2, so that it is secured against rotation relative thereto. The disks 1 and 2 encloses therebetween, a flange 3 of a hub 4 and are rotatable relative to the hub 4 against biasing action of coil springs 5. The hub 4 is formed of a hub body 6, onto which the aforementioned flange 3 is slid or pushed in axial direction in a conventional manner, and is then wedged or pressed or crimped over. For this purpose, the flange 3 has a toothing or serration 7' (only one of the teeth thereof being shown in the FIGURE) with which the flange 3 is slid or pushed onto a shoulder 7 of the hub body until it makes contact with an abutment 8 which is formed on the hub body 6 and which extends in radial direction. On the side of the flange 3 facing away from the abutment 8, the flange 3 is secured in the other axial direction by a wedged-over portion 9, which is pressed into a channel 10 formed in the flange 3 in the embodiment of the FIGURE and which merges flush into the surface zone 11 of the flange 3, next adjacent thereto in radial direction.

Friction or sliding rings 12 and 13 are provided on both sides of the flange 3. An intermediate disk or washer 14 engages the friction or sliding ring 13 and a cup or plate spring 15 is disposed between the intermediate washer 14 and the counterdisk 2.

It is believed to be apparent that, through a construction of a clutch disk in accordance with the invention, assembly defects and any functional disruption connected therewith, which can be caused by improper placement, for example, of a friction or sliding ring 13, are avoided. In addition, the invention makes possible a construction which is narrower in axial direction, since the space provided of the radial extension of the wedged-over portion is available for enlarging the friction lining, whereby the latter can, in turn, be made narrower, and it is furthermore possible to enlarge the friction surface area.

There is claimed:

1. A hub comprising a cylindrical hub body and means comprising a flange member for flanging the hub body, said flanging means being slidably mounted on and fastened to said hub body and extending in radial direction, at least one of said hub body and said flanging means being formed with profiling for effecting a form lock against relative movement thereof at least in circumferenctial direction, a respective abutment formed on said hub body on each side of said flanging means, at least one of the abutments being a wedged-over portion of the hub body received in a channel formed in said flanging means, said channel being formed in a radially extending surface region of said flanging means, and said wedged-over portion of the hub body being received in said channel flush with said surface region so as to form with said surface region a continuous annular surface extending radially from the cylindrical hub body, both the surface of the wedged-over hub body portion and the flanging means surface region being engageable by a friction ring mountable on said cylindrical hub body.

2. A hub according to claim 1 wherein said flanging means include at least one other part besides said flange member, said part extending in radial direction and being formed with said formlocking profiling.

3. A hub according to claim 1 wherein said flanging means include at least one other part besides said flange member, said channel being formed in said other part.

4. A hub according to claim 1 wherein said flange member extends in radial direction and is formed with said formlocking profiling.

5. A hub according to claim 1 wherein said channel is formed in said flange member.

6. A hub according to claim 1 wherein said wedged-over portion is a stamped out portion.

* * * * *